United States Patent [19]

Watanabe et al.

[11] 4,422,739
[45] Dec. 27, 1983

[54] AUTO FOCUS CAMERA

[75] Inventors: Sakuji Watanabe, Warabi; Akira Ogasawara, Yokohama; Nobuhiko Terui, Tokyo; Kunihisa Hoshino, Kawasaki; Ken Utagawa, Yokohama, all of Japan

[73] Assignee: Nippon Kogaku K.K., Tokyo, Japan

[21] Appl. No.: 296,143

[22] Filed: Aug. 25, 1981

[30] Foreign Application Priority Data

Aug. 30, 1980 [JP] Japan .................................. 55-120217

[51] Int. Cl.$^3$ ......................... G03B 13/20; G03B 7/08
[52] U.S. Cl. ................................... 354/404; 354/195.1
[58] Field of Search .................. 354/25 R, 25 N, 289, 354/195

[56] References Cited

U.S. PATENT DOCUMENTS

| | | | |
|---|---|---|---|
| 3,798,660 | 3/1974 | Hasegawa et al. | 354/25 N |
| 4,265,528 | 5/1981 | Bestenreiner et al. | 354/25 N |
| 4,344,024 | 8/1982 | Cocron | 354/25 |
| 4,361,390 | 11/1982 | Yamada | 354/289 |

Primary Examiner—Russell E. Adams
Attorney, Agent, or Firm—Fitzpatrick, Cella, Harper & Scinto

[57] ABSTRACT

In a camera including a photoelectric converter device disposed in the substantial imaging plane of a phototaking lens, a device for detecting the in-focus or the out-of-focus of the phototaking lens with respect to an object to be photographed from an output of said photoelectric converter device, and a device responsive to the detecting device to drive and control the phototaking lens in a direction to be in focus with respect to the object, there is provided means responsive only to the detection of said in-focus by the detecting device to restrain the operation of the drive control device. The means includes timer means for enabling the continuance of said restraint during a predetermined time after the detection of the out-of-focus by the detecting device.

5 Claims, 3 Drawing Figures

AUTO FOCUS CAMERA

BACKGROUND OF THE INVENTION

1. Field of the Invention

This invention relates to a camera having an auto focus device which drives a phototaking lens in accordance with the output of a photoelectric element array on which the image of an object to be photographed is formed, and more particularly to a single lens reflex camera in which the light beam from the phototaking lens is directed via a movable reflecting mirror to a finder and said photoelectric element array.

2. Description of the Prior Art

In a single lens reflex camera, a photoelectric element array for the detection of the in-focus of the phototaking lens, due to its necessity of being disposed at the imaging position of the lens, is provided within or near the finder optical system of the camera or in the interior of the camera body, and in any case, it is disosed rearwardly of a movable reflecting mirror. Thus, the object image formed on the photoelectric element array via the mirror during in-focus varies with the movement of the mirror resulting from a photographing operation. A technique whereby the operation of a focusing device is disabled in response to the movement of the mirror in order to prevent the focusing device from driving the phototaking lens in response to the variation of the image is known from Japanese Laid-open Utility Model Application No. 85233/1975. In this technique, however, at least minute displacement of the mirror itself or a mirror driving mechanism occurs before the operation of the focusing device is restrained, and this leads to an undesirable possibility that the phototaking lens is driven particularly where use is made of a well responsive photoelectric element and focusing device. Accordingly, as regards such minute displacement, namely, a minute fluctuation of the image on the photoelectric element array caused after the in-focus of the phototaking lens with respect to the object to be photographed has been completed, it is desired to reduce the aforementioned responsiveness.

SUMMARY OF THE INVENTION

It is an object of the present invention to provide an auto focus camera which is capable of effecting stable photography by avoiding any excessive responsiveness of the focusing device to the phototaking lens being in in-focus condition.

The camera according to the present invention has timer means for restraining the operation of the focusing device for a predetermined time after an in-focus signal put out when the phototaking lens is in focus with respect to an object to be photographed has disappeared.

The camera according to the present invention can prevent response of the focusing device caused by change in the object image formed on the photoelectric element array which change is caused in response to the movement of the mirror. Moreover, the camera of the present invention can prevent excessive response of the focusing device to very small change in the object caused during photography and also can prevent unstable focusing caused by excessive responsiveness particularly in case of a movie camera.

The invention will become more fully apparent from the following detailed description thereof taken in conjunction with the accompanying drawings.

DESCRIPTION OF THE PREFERRED EMBODIMENTS

Figure 1:
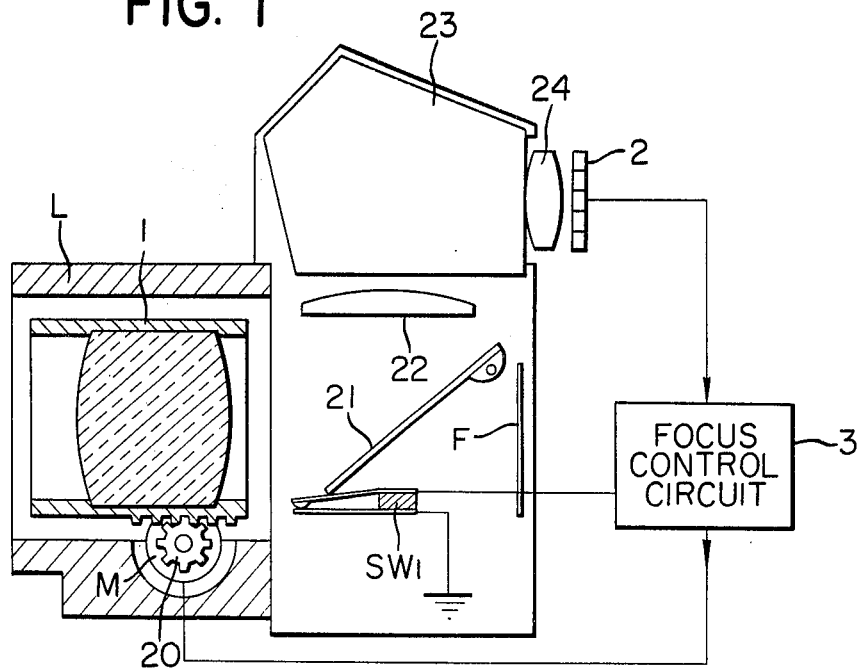
FIG. 1 is a cross-sectional view schematically showing the camera according to an embodiment of the present invention.

Embodiments of the present invention will hereinafter be described with reference to the drawings. Referring to FIG. 1, a phototaking lens L is provided with a movable cylinder 1 driven by a motor M and a drive gear 20 to move a focusing lens in the direction of the optical axis. A light beam passed through the phototaking lens is reflected by a movable reflecing mirror 21 and imaged on a focusing plate 22 and further directed to a finder eyepiece through a pentaprism 23. A photoelectric element array 2 is disposed at the re-imaged position of the object image of the focusing plate by a re-imaging lens 24 and the output thereof is transmitted to a focus control circuit 3.

Figure 2:
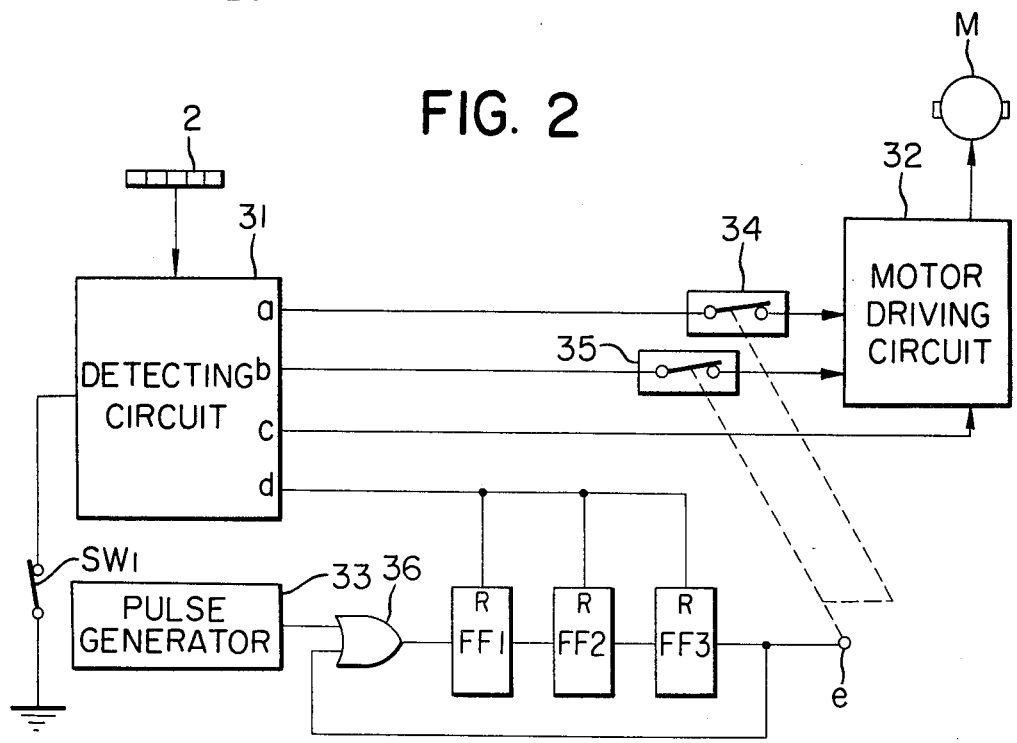
FIG. 2 is a block diagram showing an embodiment of the present invention.

The control circuit 3, as shown in FIG. 2, comprises a detecting circuit 31, a motor driving circuit 32, and a timer circuit including a pulse generator 33, flip-flop circuits FF1, FF2 and FF3, and relay switch devices 34 and 35. The detecting circuit 31 receives the output from the photoelectric element array 2 as shown, for example, in Japanese Laid-open Patent Application No. 98709/1980 (U.S. application Ser. No. 109,282 filed Jan. 3, 1980), detects the in-focus condition of the phototaking lens with respect to the object to be photographed, determines the front focus condition in which the image position lies on the object side with respect to the focal plane of the phototaking lens, the rear focus condition in which the image position lies on the opposite side to the object with respect to the focal plane, and the in-focus condition in which the image position lies on the focal plane, and puts out a front focus signal, a rear focus signal and an in-focus signal at output terminals a, b and d. The detecting circuit 31 further puts out a stop signal from an output terminal c in synchronism with the outputting of the in-focus signal. The motor driving circuit 32 controls the normal revolution, reverse revolution and sudden stop of the motor M as shown, for example, in U.S. application Ser. No. 167,912 filed July 11, 1980. The timer circuit is reset by the in-focus signal from the output terminal d of the detecting circuit 31, and starts the time counting operation by the plurality of connected flip-flops FF1, FF2 and FF3 counting clock pulses put out from the pulse generator 33 through an OR gate 36 from a point of time whereat the in-focus signal stops being put out. When a predetermined number of pulses has been counted, a relay output is produced from an output terminal e and switches 34 and 35 connected between the detecting circuit 31 and the motor driving circuit 32 are closed. A switch SW1 is provided to control the operation of the detecting circuit 31 and, as shown in FIG. 1, it may be opened during the retraction of a reflecting movable mirror 21 from the optical path of the phototaking lens to thereby impede the detecting operation of the detecting circuit 31, and may be closed in response to the return of the mirror to thereby enable the operation of the detecting circuit.

When the phototaking lens is in front focus condition with respect to the object, the detecting circuit 31 puts out an H-level front focus signal at the output terminal a. At this time, the outputs of the terminals b, c and d are at L-level. The signal at the terminal a is transmitted to the motor driving circuit 32 through a switch 34, and this circuit 32 effects normal revolution of the motor M and the movable cylinder 1 is moved along the optical axis so that the light passed through the phototaking lens L is imaged on the focal plane.

When the phototaking lens is in rear focus condition with respect to the object, the detecting circuit 31 puts out an H-level rear focus signal at the output terminal b. At this time, the outputs of the terminals a, c and d are at L-level. The signal at the terminal b is transmitted to the motor driving circuit 32 through a switch 35 and this circuit 32 effects reverse revolution of the motor M. The movable cylinder 1 is moved along the optical axis so that the light passed through the phototaking lens L is imaged on the focal plane.

When the phototaking lens L is directed to its in-focus position, the detecting circuit 31 puts out an H-level in-focus signal at the terminal d and in synchronism therewith, puts out an H-level stop signal at the terminal c. At this time, the outputs of the terminals a and b assume L-level. The in-focus signal continues to be put out as long as the phototaking lens lies at its in-focus position. The motor driving circuit 32 receives the stop signal to short-circuit the motor M and forcibly stop the motor.

When the H-level in-focus signal is produced at the terminal d, the flip-flops FF1, FF2 and FF3 are reset and an L-level output is produced at a terminal e to open the switches 34 and 35. The switches 34 and 35 remain open as long as the terminal d puts out the in-focus signal.

When the in-focus condition of the phototakinglens is confirmed by means of a display device, not shown, and a shutter button is depressed, the retracting operation of the mirror 21 is started and the mirror moves slightly by this operation, whereupon the image of the object being aimed at retracts from the photoelectric element array 2. Accordingly, the detecting circuit 31 produces an L-level output from the output terminals c and d and at the same time, starts its detecting operation with respect to another object image formed on the photoelectric element array 2 and puts out the result of the detection at the output terminal a or b. At this time, the switches 34 and 35 are open and therefore, these outputs are not immediately transmitted to the motor driving circuit 32. When the timer circuit is released from its reset condition by the L-level output from the output terminal d resulting from the aforementioned operation of the mirror, the flip-flops FF1, FF2 and FF3 count the output of the pulse generator 33 through OR gate 36. After having counted a predetermined time, they produce an H-level output at a terminal e. When the terminal e assumes H-level, this signal is transmitted to the other terminal of the OR gate 36 and the flip-flops continue to put out an H-level output at the terminal e. The counting time of the timer circuit is set to a value greater than the time required from when the output of the terminal d of the detecting circuit resulting from the start of the mirror operation assumes L-level until the switch SW1 is opened. Accordingly, when the terminal e assumes H-level, the switches 34 and 35 are closed and the terminals a and b become connected to the motor driving circuit 32, but by this time, the detecting circuit has already been made inoperative by opening of the switch SW1 and therefore, neither a front focus signal nor a rear focus signal is put out.

Depending on the difference of the exposure time on the film F, the closing of the switch SW1 resulting from the return of the mirror 21 to its shown position may occur before or after completion of the time counting by the timer circuit. Where the switch SW1 is closed before completion of the time counting by the timer by a short time of exposure, the H-level output being produced at the output terminal a or b by closing of the switches 34 and 35 is transmitted to the motor driving circuit when a predetermined time determined by the timer circuit has elapsed and on the other hand, where the switch SW1 is closed after completion of the time counting by the timer by a long time of exposure, the switches 34 and 35 are closed during the exposure, and the output from the output terminal a or b is produced after closing of the switch SW1. Accordingly, in any case, the motor M is not driven during the exposure.

Figure 3:
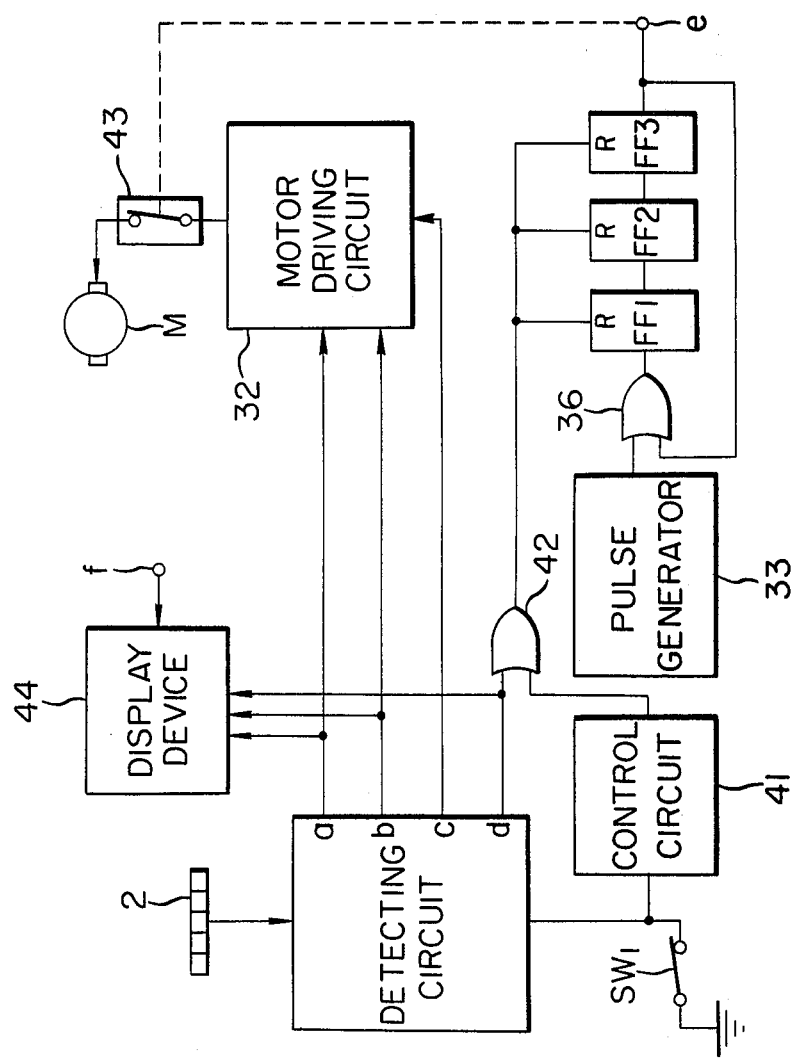
FIG. 3 is a block diagram showing another embodiment of the present invention.

By setting the predetermined count time of the timer circuit to the order of several tens of milliseconds, design may be made such that even during the photography of the camera using the shortest exposure time, the switch SW1 is closed after completion of the time counting by the timer. If such design is made, the switches 34 and 35 are already closed at a point of time whereat the movable reflecting mirror has returned to the optical path and thus, the unstable output of the photoelectric element array resulting from the vibration of the mirror immediately after its return will provide a front focus signal or a rear focus signal which will operate the motor driving circuit 32. To prevent this, in the embodiment shown in FIG. 3, there is provided a control circuit 41 which produces an H-level output in response to the opening of the switch SW1 during the retraction of the mirror, resets the flip-flops FF1, FF2 and FF3 through an OR gate 42, and produces an L-level output in response to the closing of the switch SW1 during the return of the mirror to release the resetting. Thus, during the return of the mirror to the optical path, the time counting operation of the timer is re-started and the unstable output of the photoelectric element array resulting from vibration does not affect the control of the motor. In FIG. 3, in lieu of the switches 34 and 35 of FIG. 1, a switch 43 responsive to the output of the timer is provided between the motor driving circuit and the motor. There is further shown a display device 44 for effecting displays corresponding to the signals from the output terminals a, b and d of the detecting circuit. By connecting the output terminal e of the timer circuit to the control terminal f of the display device 44, it is possible to maintain an in-focus display on the display device 44 for a predetermined time determined by the timer after the in-focus signal from the terminal d has disappeared. Also, by inputting the output of the control circuit 41 to the control terminal f in addition to the output from the output terminal e of the timer circuit, it is possible to maintain the in-focus display as long as the mirror is retracted out of the optical path.

We claim:

1. In a single lens reflex camera which comprises a movable reflecting mirror disposed across a phototaking optical path, the mirror being retracted from the phototaking optical path prior to exposure to the film; automatic focusing means having detecting means detecting the focusing state of a phototaking lens from the output of a light receiving means disposed on a substantial focusing plane of a light beam passed through the movable reflecting mirror and generating selectively an in-focus signal and an out-of-focus signal, and driving means which displaces the phototaking lens in response to the out-of-focus signal and stops displacing the phototaking lens in response to the in-focus signal; and first disabling means for disabling the automatic focusing means in response to retraction of the movable mirror from the phototaking optical path, the improvement comprising:

second disabling means for disabling the driving means during generation of the in-focus signal in response thereto to thereby restrain movement of the phototaking lens, the second disabling means including timer means which starts counting when generation of the in-focus signal has stopped and counts a predetermined time interval at least until completion of disabling of the automatic focus means by the first disabling means, the second disabling means maintaining the disabled condition of the driving means until the timer completes counting.

2. A single lens reflex camera according to claim 1, wherein said second disabling means includes switching means connected between the detecting means and the driving means and means for maintaining the switching means non-conductive during time interval from initiation of generation of the in-focus signal to completion of counting of the timer means.

3. A single lens reflex camera according to claim 1, wherein said timer means includes means for generating pulses continuously with a constant time interval and a counter which counts the pulses generated by the pulse generating means and is reset by said in-focus signal.

4. In a single lens reflex camera which comprises a movable reflecting mirror disposed across a phototaking optical path, the mirror being retracted from the phototaking optical path prior to exposure to the film and returned into the optical path after the exposure; automatic focusing means having detecting means for detecting the focusing state of the phototaking lens from the output of a light receiving means disposed on a substantial focusing plane of a light beam passed through the movable mirror and generating selectively an in-focus signal and an out-of-focus signal, and driving means which displaces the phototaking lens in response to the out-of-focus signal; and first disabling means for disabling the automatic focusing means in response to retraction of the movable mirror from the phototaking optical path, the improvement comprising:

second disabling means for disabling the driving means during generation of the in-focus signal in response thereto to restrain movement of the phototaking lens, the second disabling means including timer means which initiates counting when generation of the in-focus signal has stopped and the movable mirror has been returned into the phototaking optical path and counts a predetermined time interval, the second disabling means continuously disabling the driving means until completion of counting of the timer means.

5. A single lens reflex camera according to claim 1, wherein said timer means includes means for generating pulses continuously with a constant time interval, a counter which counts the pulses generated by the pulse generating means and is reset by said in-focus signal, and means for holding said counter in reset state from retracting of the mirror from the optical path to returning of the mirror into the optical path.

* * * * *

UNITED STATES PATENT AND TRADEMARK OFFICE
CERTIFICATE OF CORRECTION

PATENT NO. : 4,422,739

DATED : December 27, 1983

INVENTOR(S) : SAKUJI WATANABE, ET AL.

It is certified that error appears in the above-identified patent and that said Letters Patent is hereby corrected as shown below:

Column 2, line 26, "of" (second occurrence) should be --on--.

Claim 5, line 1 (Column 6, line 30) "1" should be --4--.

Signed and Sealed this

Twenty-eighth Day of February 1984

[SEAL]

Attest:

GERALD J. MOSSINGHOFF

Attesting Officer

Commissioner of Patents and Trademarks